United States Patent Office 2,754,216
Patented July 10, 1956

2,754,216

METAL DEACTIVATOR

Joseph A. Chenicek, Bensenville, Ill., assignor to Universal Oil Products Company, Des Plaines, Ill., a corporation of Delaware No Drawing. Application March 11, 1953,
Serial No. 341,845

15 Claims. (Cl. 99—163)

This application relates to a novel method of deactivating the catalytic effect of a metal contained in an organic substance to catalyze oxidative deterioration of the organic substance.

The novel method of the present invention may be utilized for the treatment of organic substances containing metals which catalyze the oxidative deterioration thereof and thus may be utilized for the stabilization of hydrocarbon distillates, including motor fuels and particularly unsaturated gasolines, including cracked gasoline, polymer gasoline, etc., kerosene, diesel oil, mineral oil, lubricating oil, fuel oil, drying oil, edible fats and oils, soya bean oil, foods, resins, rubber, greases, paraffin waxes, adhesives, photographic developers, monomers including styrene, butadiene, isoprene, etc., acetylenes, alcohols, acids, ketones, and other substrates containing metals which catalyze oxidative deterioration thereof.

As applied to gasoline, one method of refining gasoline is the copper sweetening process, in which process the gasoline is contacted with a copper-sweetening reagent. As a result of this treatment, the sweetened gasoline usually contains relatively small amounts of copper compounds which have a catalytic effect on oxidation reactions occurring when the gasoline comes in contact with air. In addition, gasolines come in contact with various metals in the course of refining, storing and shipping operations, and this also may result in the gasoline containing minor amounts of such metals as iron, cobalt, nickel, chromium, lead, etc.

As applied to fatty materials, including edible fats and oils, these materials are prepared, stored and/or transported in equipment made of metal and thereby tend to undergo oxidative deterioration due to the catalytic effect of the metal and/or of metal constituents contained in the fatty material. The edible fats and oils generally are of animal, vegetable or mineral origin. Typical representatives of these edible fats and oils include linseed oil, menhaden oil, cod liver oil, castor oil, olive oil, rapeseed oil, coconut oil, palm oil, corn oil, sesame oil, peanut oil, babassu oil, butter, fat, lard, beef tallow, etc., as well as the hydrogenated oils. It is understood that other oils and fats may be treated within the scope of the present invention, including oils and fats which have previously been subjected to various treatments, such as blowing with air, heat treatment, etc.

The compounds of the present invention which serve to deactivate the catalytic effect of metals are referred to as metal deactivators. These metal deactivators act on the metals present in the organic substance and, therefore, are effectively utilized in any substrate containing or contacting metals. The metal deactivators are distinguished from other additives generally added to organic substances for various purposes. For example in gasoline, a gum inhibitor is normally added to suppress gum formation. The metal deactivator does not substantially suppress gum formation in gasoline in the absence of metals, and, on the other hand, the gum inhibitor does not suppress the catalytic effect of metals to any considerable extent.

An antioxidant is added in edible fats and oils in order to retard the development of rancidity therein. The metal deactivator will not substantially suppress rancidity development of edible fats and oils in the absence of metals, and the antioxidant will not suppress the catalytic effect of metals in the edible fats and oils to any considerable extent. Still another typical example is in the treatment of rubber in which an antioxidant and metal deactivator are both utilized in order to prevent undesirable deterioration of the rubber, which may result in brittleness, discoloration, decreased elasticity, etc. It is understood that these are set forth merely as typical examples of representative substrates to which the novel method of the present invention may be applied and is not intended to be limited thereby. The metal deactivator and other additive supplement each other in serving to stabilize organic substrates and to prevent undesirable deterioration thereof.

In one embodiment the present invention relates to a method of stabilizing an organic substance against oxidative deterioration catalyzed by a metal which comprises incorporating in said organic substance a 2-(2-hydroxyphenyl) imidazole compound.

In a specific embodiment the present invention relates to a method of stabilizing cracked gasoline against oxidative deterioration catalyzed by a metal, which comprises incorporating in said gasoline from about 0.0001% to about 0.5% by weight of 2-(2-hydroxyphenyl) benzimidazole.

In another specific embodiment the present invention relates to a method of stabilizing lard against oxidative deterioration catalyzed by a metal, which comprises incorporating in said lard from about 0.0001% to about 0.5% by weight of 2-(2-hydroxyphenyl) benzimidazoline.

In another embodiment the present invention comprises an organic substance containing a metal which normally catalyzes oxidative deterioration of said substance and additionally containing a metal deactivator as herein set forth.

As hereinbefore set forth, the novel metal deactivator of the present invention is a 2-(2-hydroxyphenyl) imidazole compound of the structure illustrated below:

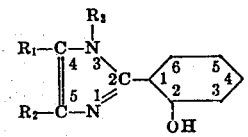

in which $R_1$, $R_2$, and $R_3$ are selected from hydrogen and hydrocarbon groups including alkyl, alkaryl, aryl, aralkyl, cycloalkyl, etc., radicals, and where $R_1$ and $R_2$ are carbon atoms of a cyclic group and particularly an aromatic group.

In another embodiment the imidazole compound for use in accordance with the present invention may comprise a 2-(2-hydroxyphenyl) imidazoline of the structure illustrated below:

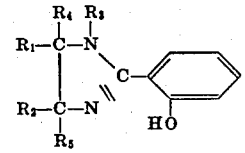

where $R_1$, $R_2$, $R_3$, $R_4$, and $R_5$ are selected from the group hereinbefore set forth. $R_1$, $R_2$, $R_3$, $R_4$, and $R_5$ groups need not necessarily be the same.

It is understood that the structural formulas hereinbefore set forth are illustrative only. The metal deactivator composition may comprise a mixture of 2 or more of these isomers, as well as a mixture of the imidazole and imidazoline compounds. In some cases 2-(2-hydroxyphenyl) imidazolidine compounds may be employed, either alone or in admixture with the imidazole or imidazoline compounds, but not necessarily with the equivalent results.

It is understood that any suitable 2-(2-hydroxyphenyl) imidazole compound having the configuration hereinbefore set forth may be employed in accordance with the present invention. The various compounds are not necessarily equivalent and certain compounds may be more effective in some substrates than in others. A preferred metal deactivator comprises 2-(2-hydroxyphenyl) benzimidazole which may be represented by the following general formula:

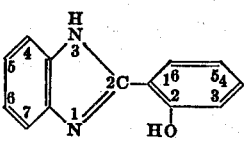

Derivatives thereof may be employed and may contain hydrocarbon or other substituents attached to one or both of the phenyl rings and/or to the carbon atom in the 2 position and/or the nitrogen atoms in the 5-membered heterocyclic ring. The following specific compounds are listed as representative of the numerous compounds which may be employed within the scope of the present invention and are not intended to unduly limit the present invention to these specific compounds. These specific compounds include 2-(2,3-dihydroxyphenyl) benzimidazole, 2-(2,4-dihydroxyphenyl) benzimidazole, 2-(2,5-dihydroxyphenyl) benzimidazole, 2-(2,6-dihydroxyphenyl) benzimidazole, 2-(2,4,6-trihydroxyphenyl) benzimidazole, etc., 2-(2-hydroxyphenyl)-4-methyl benzimidazole, 2-(2-hydroxyphenyl)-5-methyl benzimidazole, 2-(2-hydroxyphenyl)-6-methyl benzimidazole, 2-(2-hydroxyphenyl)-7-methyl benzimidazole, 2-(2-hydroxyphenyl)-4,5-dimethyl benzimidazole, 2-(2-hydroxyphenyl)-4,6-dimethyl benzimidazole, 2-(2-hydroxyphenyl)-4,7-dimethyl benzimidazole, 2-(2-hydroxyphenyl)-5,6-dimethyl benzimidazole, etc., 2-(2-hydroxyphenyl)-4,5,6-trimethyl benzimidazole, 2-(2-hydroxyphenyl)-4,5,7-trimethyl benzimidazole, 2-(2-hydroxyphenyl)-4,6,7-trimethyl benzimidazole, 2-(2-hydroxyphenyl)-5,6,7-trimethyl benzimidazole, etc. and similarly substituted compounds in which the alkyl group is selected from ethyl, propyl, butyl, amyl, hexyl, etc., as well as substituted compounds containing 2 or more different alkyl groups.

Another preferred class of deactivators comprises 2-(2-hydroxyphenyl) benzimidazoline and derivatives thereof. Specific compounds which are representative of this class include: 2-(2,3-dihydroxyphenyl) benzimidazoline, 2-(2,4-dihydroxyphenyl) benzimidazoline, 2-(2,5-dihydroxyphenyl) benzimidazoline, 2-(2,6-dihydroxyphenyl) benzimidazoline, 2-(2,4,6-trihydroxyphenyl) benzimidazoline, etc., 2-(2-hydroxyphenyl)-4-methyl benzimidazoline, 2-(2-hydroxyphenyl)-5-methyl benzimidazoline, 2-(2-hydroxyphenyl)-4,5-dimethyl benzimidazoline, 2-(2-hydroxyphenyl)-5,6-dimethyl benzimidazoline, etc., 2-(2-hydroxyphenyl)-4,5,6-trimethyl benzimidazoline, 2-(2-hydroxyphenyl)-4,6,7-trimethyl benzimidazoline, etc., as well as substituted compounds in which the substituent group is selected from ethyl, propyl, butyl, amyl, hexyl, etc., and those containing different alkyl substituent groups.

Specific compounds not containing the benzimidazole configuration are set forth below, with the understanding that these are merely representative compounds and not intended to limit the present invention thereto. These specific compounds include: 2-(2-hydroxyphenyl)-4-methyl imidazole, 2-(2-hydroxyphenyl)-4-ethyl imidazole, 2-(2-hydroxyphenyl)-4-propyl imidazole, 2-(2-hydroxyphenyl)-4-butyl imidazole, 2-(2-hydroxyphenyl)-4-amyl imidazole, 2-(2-hydroxyphenyl)-4-hexyl imidazole, etc., 2-(2-hydroxyphenyl)-4-phenyl imidazole, 2-(2-hydroxyphenyl)-4-tolyl imidazole, 2-(2-hydroxyphenyl)-4-xylyl imidazole, etc., 2-(2-hydroxyphenyl)-4-cyclopentyl imidazole, 2-(2-hydroxyphenyl)-4-cyclohexyl imidazole, etc., 2-(2-hydroxyphenyl)-4,5-dimethyl imidazole, 2-(2-hydroxyphenyl)-4,5-diethyl imidazole, 2-(2-hydroxyphenyl)-4,5-dipropyl imidazole, 2-(2-hydroxyphenyl)-4,5-dibutyl-imidazole, 2-(2-hydroxyphenyl)-4,5-diamyl imidazole, 2-(2-hydroxyphenyl)-4,5-dihexyl imidazole, etc., 2-(2-hydroxyphenyl)-4-methyl-5-ethyl imidazole, 2-(2-hydroxyphenyl)-4-methyl-5-propyl imidazole, 2-(2-hydroxyphenyl)-4-methyl-5-butyl imidazole, 2-(2-hydroxyphenyl)-4-methyl-5-amyl imidazole, 2-(2-hydroxyphenyl)-4-methyl-5-hexyl imidazole, etc., 2-(2-hydroxyphenyl)-4-ethyl-5-propyl imidazole, 2-(2-hydroxyphenyl)-4-ethyl-5-butyl imidazole, 2-(2-hydroxyphenyl)-4-ethyl-5-amyl imidazole, 2-(2-hydroxyphenyl)-4-ethyl-5-hexyl imidazole, etc., 2-(2-hydroxyphenyl)-4-butyl-5-amyl imidazole, 2-(2-hydroxyphenyl)-4-butyl-5-hexyl imidazole, etc., 2-(2-hydroxyphenyl)-4-amyl-5-hexyl imidazole, etc., 2-(2-hydroxyphenyl)-4-phenyl-5-methyl imidazole, 2-(2-hydroxyphenyl)-4-tolyl-5-methyl imidazole, 2-(2-hydroxyphenyl)-4-xylyl-5-ethyl imidazole, 2-(2-hydroxyphenyl)-4-cyclopentyl-5-ethyl imidazole, 2-(2-hydroxyphenyl)-4-cyclohexyl-5-butyl imidazole, etc., 2-(2-hydroxyphenyl)-4-methyl-5-phenyl imidazole, 2-(2-hydroxyphenyl)-4-ethyl-5-tolyl imidazole, etc., similarly substituted 2-(2-hydroxyphenyl) imidazolines, as well as similarly substituted imidazolines also having a substituent attached to the 2 carbon atom of the heterocyclic ring.

As hereinbefore set forth the metal deactivator may comprise compounds having substituents attached to one of the nitrogen atoms and may include such compounds as 3-methyl-2-(2-hydroxyphenyl) imidazole, 3-ethyl-2-(2-hydroxyphenyl) imidazole, 3-propyl-2-(2-hydroxyphenyl) imidazole, 3-butyl-2-(2-hydroxyphenyl) imidazole, 3-amyl-2-(2-hydroxyphenyl) imidazole, 3-hexyl-2-(2-hydroxyphenyl) imidazole, etc., 3-phenyl-2-(2-hydroxyphenyl) imidazole, 3-tolyl-2-(2-hydroxyphenyl) imidazole, 3-xylyl-2-(2-hydroxyphenyl) imidazole, etc. 3-cyclopentyl-2-(2-hydroxyphenyl) imidazole, 3-cyclohexyl-2-(2-hydroxyphenyl) imidazole, etc., 3-methyl-2-(2-hydroxyphenyl) imidazoline, 3-ethyl-2-(2-hydroxyphenyl) imidazoline, 3-propyl-2-(2-hydroxyphenyl) imidazoline, 3-butyl-2-(2-hydroxyphenyl) imidazoline, 3-amyl-2-(2-hydroxyphenyl) imidazoline, 3-hexyl-2-(2-hydroxyphenyl) imidazoline, etc., 3-phenyl-2-(2-hydroxyphenyl) imidazoline, 3-tolyl-2-(2-hydroxyphenyl) imidazoline, 3-xylyl-2-(2-hydroxyphenyl) imidazoline, etc., 3-cyclopentyl-2-(2-hydroxyphenyl) imidazoline, 3-cyclohexyl-2-(2-hydroxyphenyl) imidazoline, etc.

It is understood that numerous compounds may be prepared and utilized in accordance with the present invention and that all of these compounds will not necessarily be equivalent. These compounds may be prepared in any suitable manner. For example, 2-(2-hydroxyphenyl) benzimidazole may be prepared by reacting salicylaldehyde and o-phenylene diamine in benzene solution at elevated temperature and crystallizing the resultant product from benzene or other suitable solvent. 2-(2-hydroxyphenyl)-4-methyl imidazoline may be prepared by reacting salicylaldehyde and 1,2-diaminopropane at elevated temperature and crystallizing the product from methanol, followed by recrystallization from isopropyl alcohol. Other imidazole compounds may be prepared by similar methods using different reactants, or these compounds may be prepared in any other suitable manner.

As hereinbefore set forth the metal deactivator generally will be used in conjunction with other additives. The other additive will depend upon the particular substrate being stabilized. For example, in the stabilization of edible fats and oils, a preferred antioxidant comprises butylated hydroxyanisole. Other antioxidants include nordihydroguaiaretic acid (N. D. G. A.), gum guaiac, propyl gallate, lauryl thiodipropionate, various alkylated phenolic compounds including 2,6-ditertiary-butyl-4-methylphenol, 2,4-dimethyl-6-tertiary-butylphenol, etc. As applied to gasoline, satisfactory gum inhibitors include various phenols, amines, aminophenols, fractions of wood tar, etc. Some of these inhibitors are marketed in the form of a solution in a solvent such as alcohol, ether, etc. A particularly suitable gum inhibitor comprises a p-phenylene diamine and more particularly N,N'-di-secondary-butyl-p-phenylene diamine. Other phenylene diamine compounds include N,N'-di-isopropyl-p-phenylene diamine, N,N'-disecondary-amyl-p-phenylene diamine, N,N'-di-secondary-hexyl-p-phenylene diamine, etc., N-propyl-N'-butyl-p-phenylene diamine, N-butyl-N'-amyl-p-phenylene diamine, etc. Another particularly suitable gum inhibitor comprises a p-aminophenol and more particularly a mixture of a major proportion of N-n-butyl-p-aminophenol and a minor proportion of N,N'-di-n-butyl-p-phenylene diamine in an alcoholic solvent. Other p-aminophenol compounds include N-propyl-p-aminophenol, N-amyl-p-aminophenol, N-hexyl-p-aminophenol, etc. Still other suitable inhibitors comprise butylated hydroxyanisole and 2,2-dimethyl-6-tertiary-butyl-5-hydroxy-coumaran.

The antioxidant, gum inhibitor or other additive generally is utilized in concentrations of below about 1% by weight and preferably from about 0.0001% to about 1% by weight. As hereinbefore set forth, the metal deactivator is utilized in small concentrations and thus may range from about 0.0001% to about 0.5% by weight of the substrate. The metal deactivator may be marketed as such or dissolved in a suitable solvent which is not reactive therewith. In some cases, when a solvent is used for the antioxidant, gum inhibitor, etc., the same solvent may be used for the metal deactivator and thus the two or more compounds, when desired, may be prepared as a mixture in a suitable solvent and the product marketed as a single commodity of a two-fold purpose.

The following examples are introduced to illustrate further the novelty and utility of the present invention but not with the intention of unduly limiting the same.

*Example I*

2-(2-hydroxyphenyl) benzimidazole was prepared by heating 0.2 mols of salicylaldehyde and 0.2 mols of o-phenylene diamine in benzene solution until 0.2 mols of water had separated. Removal of the benzene left a viscous oil which solidified after heating briefly at 220° C. The product, comprising 2-(2-hydroxyphenol) benzimidazole, was recovered by crystallization from benzene.

The gasoline used in this example was a Pennsylvania thermally cracked gasoline which, upon the addition of 0.006% by weight of an antioxidant comprising N,N'-di-secondary-butyl-p-phenylene diamine, had an induction period of 560 minutes. Upon the addition of one mg. of copper, in the form of copper oleate, per liter of gasoline, the induction period of the gasoline fell to 130 minutes. However, upon the addition of 0.001% by weight of 2-(2-hydroxyphenyl) benzimidazole to another sample of the gasoline containing 0.006% by weight of N,N'-di-secondary-butyl-p-phenylene diamine and 1 mg. of copper per liter, the induction period of the gasoline was 570 minutes.

It will be noted that the metal deactivator of the present invention served to offset the deleterious effect of the copper and produced a final gasoline of high stability.

*Example II*

The metal deactivator used in this example comprised 2-(2-hydroxyphenyl) benzimidazoline. When 0.001% by weight of this deactivator was added to another sample of the gasoline described in Example I and containing 0.006% by weight of the N,N'-di-secondary-butyl-p-phenylene diamine inhibitor and one mg. of copper per liter, the induction period of the gasoline was 430 minutes.

*Example III*

The metal deactivator used in this example was 2-(2-hydroxyphenyl) imidazoline hydrate. This material had a melting point of 203–204° C.

This metal deactivator was used in a thermally cracked gasoline which, with the addition of 0.006% by weight of N,N'-di-secondary-butyl-p-phenylene diamine inhibitor, had an induction period of 660 minutes. Upon the addition of one mg. of copper per liter to another sample of the inhibited gasoline, the induction period fell to 120 minutes. However, upon the addition of 0.005% by weight of 2-(2-hydroxyphenyl) imidazoline hydrate, the induction period of the gasoline was 600 minutes.

*Example IV*

The metal deactivator used in this example comprised 2-(2-hydroxyphenyl)-4-methyl imidazoline. This compound had a melting point of 174–175° C.

The gasoline used in this example, when inhibited with 0.006% by weight of N,N'-di-secondary-butyl-p-phenylene diamine, had an induction period of 375 minutes. Upon the addition of one mg. of copper per liter to another sample of the inhibited gasoline, the induction period fell to 135 minutes. However, upon the addition of 0.005% by weight of 2-(2-hydroxyphenyl)-4-methyl imidazoline, the induction period of the gasoline was restored to its original inhibited value of 375 minutes.

*Example V*

The metal deactivator used in this example comprised 2-(2-hydroxyphenyl)-4,5-diphenyl imidazole. This compound had a melting point of 202° C. and was prepared by the reaction of benzil, salicylaldehyde and ammonia.

The gasoline used in this example was a Pennsylvania thermally cracked gasoline which had a blank induction period of about 75 minutes. Upon the addition of 0.005% by weight of N,N'-di-secondary-butyl-p-phenylene diamine inhibitor, the induction period of the gasoline was increased to about 465 minutes. Upon the addition of one mg. of copper per liter of the inhibited gasoline, the induction period fell to about 180 minutes. However, upon the addition of 0.01% by weight of 2-(2-hydroxyphenyl)-4,5-diphenyl imidazole to another sample of the gasoline containing both inhibitor and copper, the induction period of the gasoline was increased to 305 minutes.

*Example VI*

The lard used in this example may have a normal stability period of 4 hours as determined by the Active Oxygen Method. This method is a standard test for determining stability of lard. In general, this test comprises bubbling air through a sample of the lard and periodically determining the peroxide number. The results are reported as the number of hours required to reach a peroxide number of 20.

In order to determine the effect of metal, a 3-inch strip of 18 gauge copper wire is added to a sample of the lard. The stability of the lard, upon the addition of copper, will be reduced from 4 hours to 1 hour. The deleterious effect of the copper may be offset by the addition to the lard of 0.002% by weight of 2-(2-hydroxyphenyl) benzimidazole.

*Example VII*

To another sample of the lard described in Example VI, 0.02% by weight of butylated hydroxyanisole is added and, in the absence of copper, the lard will have a stability period of about 33 hours. However, upon the addition of copper to the lard containing butylated hydroxyanisole, the stability period of the lard will drop to 2 hours. Here again the deleterious effect of the lard may be offset by adding thereto 0.005% by weight of 2-(2-hydroxyphenyl) benzimidazole.

Example VIII

Paraffin wax may be stabilized against oxidative deterioration and deterioration caused by metal constituents by incorporating in the paraffin wax 0.02% by weight of an antioxidant and 0.01% by weight of 2-(2-hydroxyphenyl)-4,5-dimethyl imidazole.

Example IX

This example illustrates the use of the metal deactivator for the stabilization of rubber to prevent oxidative deterioration catalyzed by metals. 0.02% by weight of 2-(2-hydroxyphenyl) benzimidazole may be added to the latex resulting from the emulsion polymerization of butadiene and styrene, after which the latex is coagulated and dried. This will serve to retard oxidative deterioration catalyzed by metals and the rubber will be improved as to color, strength, elasticity, etc.

I claim as my invention:

1. An organic substance containing a metal constituent which normally catalyzes deterioration of said substance and additionally containing a 2-(2-hydroxyphenyl) imidazole compound in a small but sufficient amount to deactivate the catalytic effect of said metal constituent.

2. An organic substance containing a metal constituent which normally catalyzes deterioration of said substance and additionally containing a 2-(2-hydroxyphenyl) benzimidazole compound in a small but sufficient amount to deactivate the catalytic effect of said metal constituent.

3. An organic substance containing a metal constituent which normally catalyzes deterioration of said substance and additionally containing 2-(2-hydroxyphenyl) benzimidazoline in a small but sufficient amount to deactivate the catalytic effect of said metal constituent.

4. An organic substance containing a metal constituent which normally catalyzes deterioration of said substance and additionally containing 2-(2-hydroxyphenyl) benzimidazole in a small but sufficient amount to deactivate the catalytic effect of said metal constituent.

5. An organic substance containing a metal constituent which normally catalyzes deterioration of said substance and additionally containing 2-(2-hydroxyphenyl) imidazoline in a small but sufficient amount to deactivate the catalytic effect of said metal constituent.

6. Gasoline containing a metal constituent which normally catalyzes deterioration thereof and additionally containing from about 0.0001% to about 0.5% by weight of a 2-(2-hydroxyphenyl) imidazole compound.

7. Cracked gasoline containing from about 0.0001% to about 1% by weight of an antioxidant and from about 0.0001% to about 0.5% by weight of a 2-(2-hydroxyphenyl) benzimidazole.

8. Cracked gasoline containing from about 0.0001% to about 1% by weight of N,N'-di-secondary-butyl-p-phenylene diamine and from about 0.0001% to about 0.5% by weight of 2-(2-hydroxyphenyl) benzimidazole.

9. Fatty material containing a metal constituent which normally catalyzes deterioration thereof and additionally containing from about 0.0001% to about 0.5% by weight of a 2-(2-hydroxyphenyl) imidazole compound.

10. Lard containing from about 0.0001% to about 1% by weight of butylated hydroxyanisole and from about 0.0001% to about 0.5% by weight of 2-(2-hydroxyphenyl) benzimidazole.

11. An organic substance selected from the group consisting of fatty and hydrocarbon materials and containing a metal constituent which normally catalyzes oxidative deterioration thereof, said substance additionally containing, in a small but sufficient amount to deactivate the catalytic effect of said metal constituent, a compound selected from the group consisting of a 2-(2-hydroxyphenyl) imidazole and a 2-(2-hydroxyphenyl) imidazoline.

12. An organic substance selected from the group consisting of fatty and hydrocarbon materials and containing a metal constituent which normally catalyzes oxidative deterioration thereof, said substance additionally containing 2-(2-hydroxyphenyl) benzimidazole in a small but sufficient amount to deactivate the catalytic effect of said metal constituent.

13. An organic substance selected from the group consisting of fatty and hydrocarbon materials and containing a metal constituent which normally catalyzes oxidative deterioration thereof, said substance additionally containing 2-(2-hydroxyphenyl) benzimidazoline in a small but sufficient amount to deactivate the catalytic effect of said metal constituent.

14. A hydrocarbon material containing a metal constituent which normally catalyzes deterioration of said material and additionally containing a 2-(2-hydroxyphenyl) imidazole compound in a small but sufficient amount to deactivate the catalytic effect of said metal constituent.

15. A hydrocarbon distillate boiling in the gasoline range containing a metal constituent which normally catalyzes deterioration of said distillate and additionally containing a 2-(2-hydroxyphenyl) imidazole compound in a small but sufficient amount to deactivate the catalytic effect of said metal constituent.

References Cited in the file of this patent

UNITED STATES PATENTS

| | | |
|---|---|---|
| 1,805,953 | Morton | May 19, 1931 |
| 2,553,183 | Caron et al. | May 15, 1951 |